(12) United States Patent
Zhang et al.

(10) Patent No.: US 12,265,487 B2
(45) Date of Patent: Apr. 1, 2025

(54) METHOD AND CIRCUIT FOR ACCESSING WRITE DATA PATH OF ON-CHIP STORAGE CONTROL UNIT

(71) Applicant: SUNLUNE (SINGAPORE) PTE. LTD., Beijing (CN)

(72) Inventors: Yusheng Zhang, Beijing (CN); Peijia Tian, Beijing (CN); Kai Cai, Beijing (CN); Fuquan Wang, Beijing (CN)

(73) Assignee: SUNLUNE (SINGAPORE) PTE. LTD., Beijing (CN)

( * ) Notice: Subject to any disclaimer, the term of this patent is extended or adjusted under 35 U.S.C. 154(b) by 0 days.

(21) Appl. No.: 18/365,242

(22) Filed: Aug. 4, 2023

(65) Prior Publication Data

US 2023/0376431 A1 Nov. 23, 2023

Related U.S. Application Data

(63) Continuation of application No. PCT/CN2022/141914, filed on Dec. 26, 2022.

(30) Foreign Application Priority Data

Dec. 30, 2021 (CN) .......................... 202111637657.5

(51) Int. Cl.
G06F 13/16 (2006.01)
(52) U.S. Cl.
CPC ...... *G06F 13/1668* (2013.01); *G06F 13/1642* (2013.01)
(58) Field of Classification Search
CPC ............ G06F 13/1668; G06F 13/1642; G06F 3/0613; G06F 3/0635; G06F 3/0683; G06F 13/404; G06F 2212/1016; G06F 12/10

(Continued)

(56) References Cited

U.S. PATENT DOCUMENTS 5,530,845 A * 6/1996 Hiatt ...................... G06F 13/16
710/63
6,501,761 B1 * 12/2002 Pannell ................... H04L 61/10
370/452

(Continued)

FOREIGN PATENT DOCUMENTS

CN 1477532 A 2/2004
CN 1794214 A 6/2006

(Continued)

OTHER PUBLICATIONS

International Search Report dated Mar. 17, 2023 in International Application No. PCT/CN2022/141914. English translation attached.

(Continued)

*Primary Examiner* — Yaima Rigol
*Assistant Examiner* — Edward Waddy, Jr.

(57) ABSTRACT

The present disclosure discloses a method and circuit for accessing a write data path of an on-chip storage control unit. The method includes: transmitting, by the write data path interface, the write address and the write data to an address conversion unit; transmitting, by the address conversion unit, a target address and the write data to a plurality of storage control units, and determining, by the address conversion unit, a target storage control unit; obtaining, by the address conversion unit, a feedback signal of the target storage control unit, and transmitting, by the address conversion unit, the feedback signal to the target controller; and storing the write data.

11 Claims, 3 Drawing Sheets

(58) Field of Classification Search
USPC .............. 711/154, 202, 12.001, 12.058, 206, 711/12.002
See application file for complete search history.

(56) References Cited

U.S. PATENT DOCUMENTS

| | | | | |
|---|---|---|---|---|
| 7,363,418 | B1* | 4/2008 | Westin | .................. G06F 3/0611 |
| | | | | 711/E12.019 |
| 7,945,760 | B1* | 5/2011 | Barry | .................. G06F 9/30032 |
| | | | | 711/202 |
| 10,635,596 | B2* | 4/2020 | Saito | .................. G06F 12/0246 |
| 2008/0056050 | A1* | 3/2008 | Takai | ...................... G11C 29/02 |
| | | | | 365/230.01 |
| 2012/0084486 | A1* | 4/2012 | Jinno | .................. G06F 13/4022 |
| | | | | 710/316 |
| 2014/0355363 | A1 | 12/2014 | Byeon | |
| 2016/0112318 | A1* | 4/2016 | Tanimoto | .............. H04L 45/745 |
| | | | | 370/392 |
| 2019/0317693 | A1 | 10/2019 | La Fratta et al. | |
| 2021/0034517 | A1* | 2/2021 | Leng | .................. G06F 12/0607 |

FOREIGN PATENT DOCUMENTS

| | | |
|---|---|---|
| CN | 102541678 A | 7/2012 |
| CN | 109240174 A | 1/2019 |
| CN | 109800192 A | 5/2019 |
| CN | 110727637 A | 1/2020 |
| CN | 112543922 A | 3/2021 |
| CN | 114003526 A | 2/2022 |

OTHER PUBLICATIONS

First Office Action from corresponding Chinese Application No. 202111637657.5, dated Feb. 11, 2022. English translation attached.

The Grant Notice from corresponding Chinese Application No. 202111637657.5, dated Mar. 5, 2022. English translation attached.

* cited by examiner

METHOD AND CIRCUIT FOR ACCESSING WRITE DATA PATH OF ON-CHIP STORAGE CONTROL UNIT

CROSS-REFERENCE TO RELATED APPLICATION

The present application is a continuation of International Application No. PCT/CN2022/141914 filed on Dec. 26, 2022, which claims a priority to Chinese Patent Application No. 202111637657.5, titled "METHOD AND CIRCUIT FOR ACCESSING WRITE DATA PATH OF ON-CHIP STORAGE CONTROL UNIT", and filed on Dec. 30, 2021, the entire disclosure of which is incorporated herein by reference.

FIELD

The present disclosure belongs to the field of integrated circuit technologies, and more particularly, to a method and circuit for accessing a write data path of an on-chip storage control unit.

BACKGROUND

The Direct Acyclic Graph (DAG) technology is widely applied in proof-of-work algorithms. A DAG has a volume gradually increases. Data on which a proof-of-work chip relies for its operation is a DAG file. Therefore, before an operation of an operational chip, the DAG needs to be written to a storage space of the chip. In related technical solutions, to solve the above technical problems, a master computer transmits the entire DAG to the operational chip through a high-speed bus. While receiving data, the operational chip completes protocol parsing internally to extract the DAG, and writes the DAG to a local storage.

However, the related solutions have the following problems. 1) The write data path lacks data flow control, and thus a possibility of packet loss and error code generation exists, resulting in poor reliability. 2) Control of the write data path cannot be configured flexibly. 3) A damaged region in a storage unit may lead to corruption of the stored DAG data. Therefore, an error rate is increased, which in turn leads to a reduction in computing power of the operational chip.

SUMMARY

The overview of the subject matter is described in detail below, and is not intended to limit the scope of the claims. To this end, the present disclosure provides a method and circuit for accessing a write data path of an on-chip storage control unit.

To solve the above technical problems, embodiments of the present disclosure provide the following technical solutions.

In a first aspect, a method for accessing a write data path of an on-chip storage control unit is provided according to embodiments of the present disclosure. The method includes: transmitting, by a target controller, a write address and write data to a write data path interface; transmitting, by the write data path interface, the write address and the write data to an address conversion unit; transmitting, by the address conversion unit, a target address and the write data to a plurality of storage control units, and determining, by the address conversion unit, a target storage control unit; obtaining, by the address conversion unit, a feedback signal of the target storage control unit, and transmitting, by the address conversion unit, the feedback signal to the target controller; and transmitting, by the target controller in response to the feedback signal being writable, a write signal to the target storage control unit, and storing, by the target storage control unit in response to the write signal being received, the write data.

In an exemplary implementation, the method further includes, prior to the action of transmitting, by the target controller, the write address and the write data to the write data path interface: obtaining the target controller based on a selection of a channel selection unit on a plurality of controllers; and connecting the target controller to the write data path interface based on the channel selection unit.

In an exemplary implementation, the action of transmitting, by the address conversion unit, the target address and the write data to the plurality of storage control units, and determining, by the address conversion unit, the target storage control unit includes: converting, by the address conversion unit based on configuration information, the write address to obtain the target address; and transmitting, by the address conversion unit, the target address and the write data to the plurality of storage control units, and determining, by the address conversion unit, the target storage control unit.

In an exemplary implementation, the action of obtaining, by the address conversion unit, the feedback signal of the target storage control unit, and transmitting, by the address conversion unit, the feedback signal to the target controller includes: transmitting, by the address conversion unit, the feedback signal to the target controller through the write data path interface.

In an exemplary implementation, the action of transmitting, by the target controller in response to the feedback signal being writable, the write signal to the target storage control unit, and storing, by the target storage control unit in response to the write signal being received, the write data includes: detecting, by the target controller, the feedback signal to determine whether the feedback signal is writable; determining, by the target controller in response to determining that the feedback signal is writable, the target storage control unit; and controlling, by the target controller, the target storage control unit to store the write data.

In an exemplary implementation, the action of controlling, by the target controller, the target storage control unit to store the write data includes: generating, by the target controller based on the target storage control unit, the write signal; transmitting, by the target controller, the write signal to the address conversion unit through the write data path interface; transmitting, by the address conversion unit, the write signal to the target storage control unit; and storing, by the target storage control unit based on the write signal and the target address, the write data.

In a second aspect, an apparatus for accessing a write data path of an on-chip storage unit is further provided according to embodiments of the present disclosure. The apparatus includes: a first transmitting module configured to obtain, based on a selection from a plurality of controllers by a channel selection unit, a target controller; connect the target controller to a write data path interface through the channel selection unit; transmit, by a target controller, a write address and write data to the write data path interface; a second transmitting module configured to transmit, by the write data path interface, the write address and the write data to an address conversion unit; a determining module configured to transmit, by the address conversion unit, a target address and the write data to a plurality of storage control units, and determine, by the address conversion unit, a target storage control unit; a feedback module configured to obtain, by the address conversion unit, a feedback signal of the target storage control unit, and transmit, by the address conversion unit, the feedback signal to the target controller; and a storage module configured to transmit, by the target controller in response to the feedback signal being writable, a write signal to the target storage control unit, and store, by the target storage control unit in response to the write signal being received, the write data.

In a third aspect, a circuit for accessing a write data path of an on-chip storage control unit is further provided according to embodiments of the present disclosure. The circuit includes: a plurality of controllers configured to be screened to determine a target controller; a write data path interface configured to receive a write address and write data transmitted by the target controller; an address conversion unit configured to receive the write address and the write data that are transmitted by the write data path interface, and a target control storage unit; and a plurality of storage control units configured to receive a target address and the write data that are transmitted by the address conversion unit, and transmit a feedback signal to the target controller. The target controller is configured to determine, from the plurality of storage control units based on the feedback signal, whether the target storage control unit is writable, and control the target storage control unit to store the write data in response to determining that the target storage control unit is writable.

In an exemplary implementation, the plurality of controllers is connected to a channel selection unit. The channel selection unit is configured to screen the plurality of controllers to determine the target controller.

In an exemplary implementation, the channel selection unit and the address conversion unit are connected to a control unit.

In an exemplary implementation, the address conversion unit is configured to convert, in response to the write address being received, the write address into the target address based on configuration information, and transmit the target address and the write data to the storage control unit; and the address conversion unit is configured to automatically skip a damaged storage control unit in a process of converting the write address.

Additional aspects and advantages of the present disclosure will be provided at least in part in the following description, or will become apparent at least in part from the following description, or can be learned from practicing of the present disclosure.

DETAILED DESCRIPTION

Figure 1:
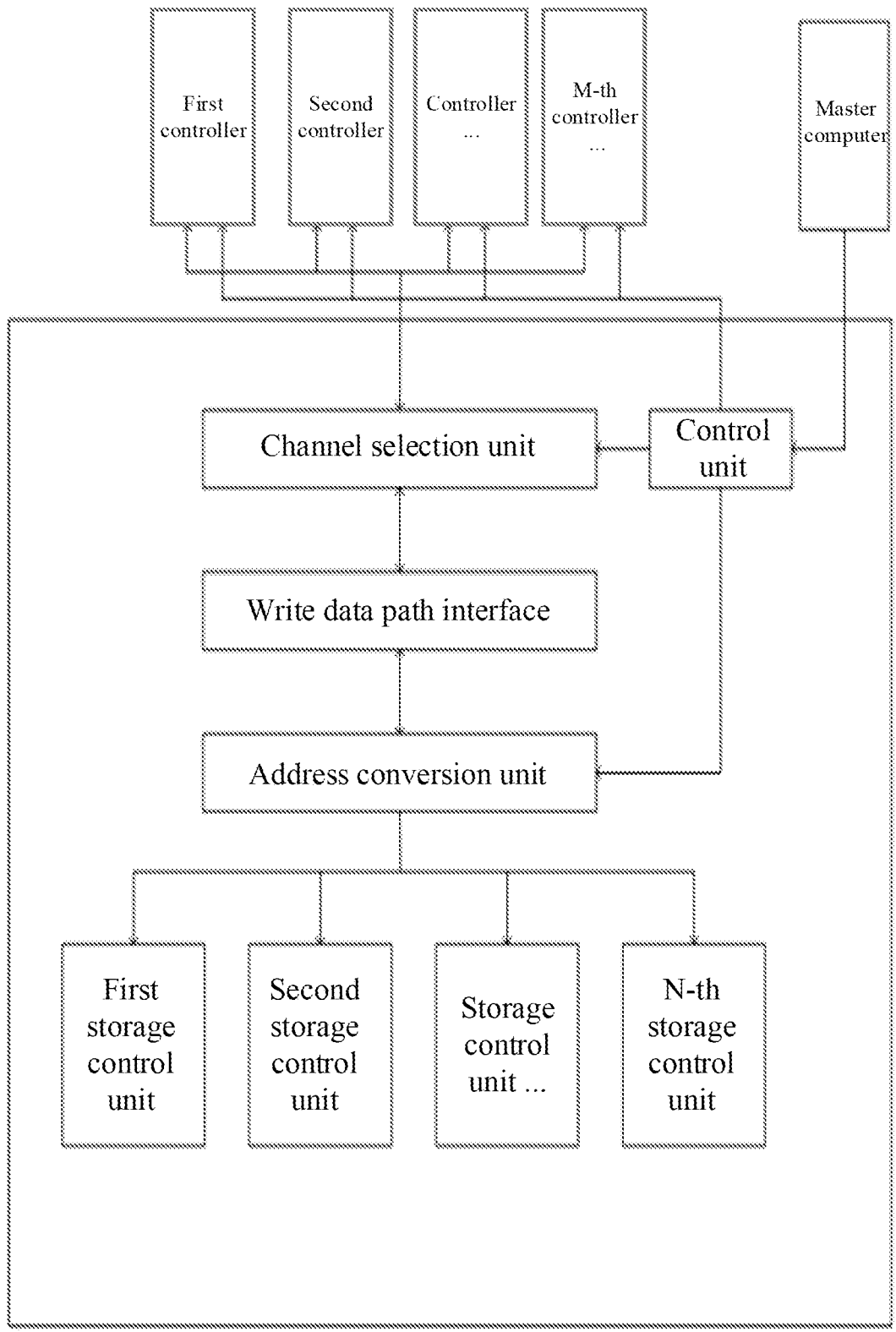
FIG. 1 is a block diagram showing a structure of a circuit for accessing a write data path of an on-chip storage control unit according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the accompanying drawings are illustrative only, and are intended to explain, rather than limiting, the present disclosure.

To facilitate understanding of embodiments, relevant terms will be explained.

1) DAG Technology

To facilitate understanding of embodiments of the present disclosure, a circuit for accessing a write data path of an on-chip storage control unit on which the embodiments are based is described below.

As illustrated in FIG. 1, a circuit for accessing a write data path of an on-chip storage control unit is provided according to an embodiment of the present disclosure. The circuit includes a master computer, a plurality of controllers, a channel selection unit, a write data path interface, an address conversion unit, and a plurality of storage control units.

The master computer has a control unit disposed thereon. The control unit is connected to the address conversion unit and the channel selection unit. The master computer is configured to control the control unit to complete, through the control unit, configuration information for the address conversion unit and configuration information for the channel selection unit.

The control unit is configured to operate under control of a clock signal. Various micro-operation instructions are issued at specified time points under the control of the clock signal. One clock pulse may issue one micro-operation instruction or a group of micro-operation instructions that may be executed in parallel.

The plurality of controllers is configured to be screened to determine a target controller. In some embodiments, any number of controllers may be provided, each of which may be connected to an external device. As illustrated in FIG. 1, the plurality of controllers may include a first controller, a second controller, . . . , and an M-th controller.

The plurality of controllers is provided to allow a plurality of external devices to access data in the storage control unit, or to allow the plurality of external devices to store data to the storage control unit.

In an exemplary embodiment of the present disclosure, the channel selection control unit can be configured to determine, based on priorities of write data of the plurality of controllers, which controller is to be used as a target controller. Therefore, when the plurality of external devices is connected to the write data path interface through the plurality of controllers, an order of connections between the plurality of controllers and the write data path interface may be determined based on the priorities of the write data corresponding to the plurality of controllers, which improves data storage efficiency or data access efficiency.

The write data path interface is configured to receive a write address and write data that are transmitted by the target controller. The write data path interface is configured to be synchronized with the clock signal, and transmit the write address and the write data to the address conversion unit based on the clock signal. Therefore, timing control of packets of the write data through the data flow can be realized, which prevents a packet loss and generation of error codes, and ensures correctness and integrity of the write data in a transmission process.

In some embodiments, when an input signal of the write data path interface is low level, the low level of the write data path interface is sampled when a rising edge of a clock arrives. Therefore, an output signal of the write data path interface outputs a low level after the rising edge. When the input signal of the write data path interface is high level, the high level of the write data path interface is sampled when the rising edge of the clock arrives. Therefore, the output signal of the write data path interface outputs a high level after the rising edge. The address conversion unit is configured to receive the write address and the write data that are transmitted by the write data path interface. The address conversion unit is configured to convert, in response to the write address being received, the write address into a target address based on the configuration information, and transmit the target address and the write data to the storage control unit.

In some embodiments, the address conversion unit is configured to automatically skip a damaged storage control unit in a process of converting the write address.

As illustrated in FIG. 1, the plurality of storage control units may include a first storage control unit, a second storage control unit, . . . , and an M-th storage control unit.

The plurality of storage control units is configured to receive the target address and the write data that are transmitted by the address conversion unit, and transmit a feedback signal to the target controller. The target controller is configured to determine, from the plurality of storage control units based on the feedback signal, whether a target storage control unit is writable, and control the target storage control unit to store the write data in response to determining that the target storage control unit is writable. Each storage control unit manages private storage of a certain capacity.

The storage control unit hit by the address conversion unit is the target storage control unit. The address conversion unit is configured to transmit, in response to receiving the feedback signal transmitted by the target storage control unit, the feedback signal to the write data path interface. The write data path interface is configured to transmit the received feedback signal to the target controller.

The target controller is configured to detect the received feedback signal. When the feedback signal is high level, it indicates that the target storage control unit is allowed to receive a write signal. On this basis, the target controller is configured to generate the write signal, and transmit the write signal to the address conversion unit through the write data path interface. The address conversion unit is configured to transmit the write signal to the target storage control unit. The target storage control unit is configured to write, in response to receiving the write signal, the write data to the private storage in one or more times based on the target address.

Figure 2:
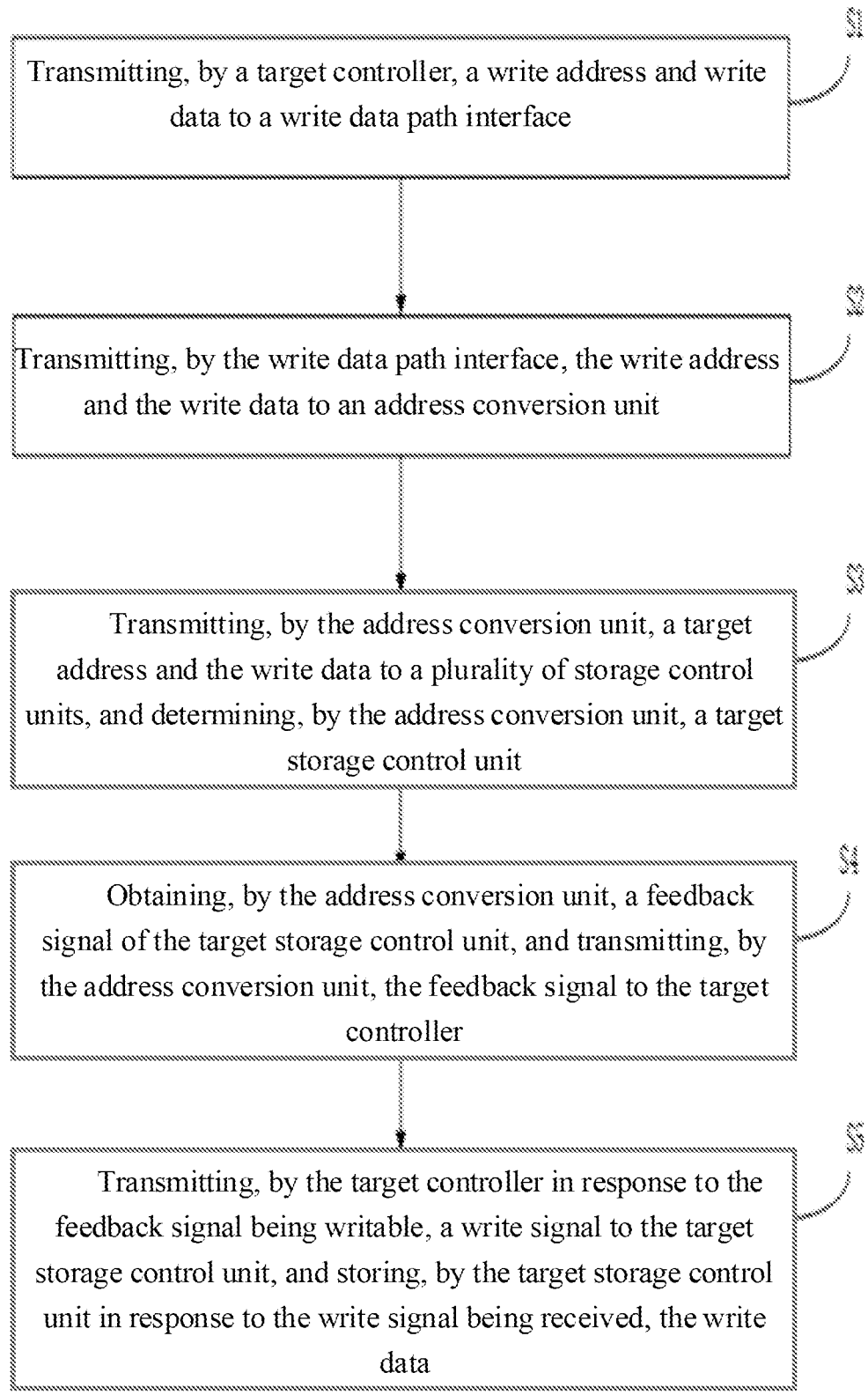
FIG. 2 is a flowchart illustrating a method for accessing a write data path of an on-chip storage control unit according to an embodiment of the present disclosure.

As illustrated in FIG. 2, a method for accessing a write data path of an on-chip storage control unit is provided according to an embodiment of the present disclosure. The method includes actions at blocks S1 to S5.

At block S1, a write address and write data are transmitted by a target controller to a write data path interface.

In some embodiments, the master computer turns on the target controller through the control unit, and the channel selection unit has the right to decide which controller is connected to the write data path interface.

The channel selection unit is configured to: before the write address and write data are transmitted by the target controller to the write data channel interface, determine the target controller and establish a connection between the target controller and the write data path interface. The target controller is configured to transmit the write data and the write address to the write data path interface.

At block S2, the write address and the write data are transmitted by the write data path interface to an address conversion unit.

In some embodiments, the write data path interface is configured to control transmission timing of the write data through a data flow. When an input signal of the write data path interface is high level, the write data path interface is configured to transmit the write data and the write address to the address conversion unit. When the input signal of the write data path interface is low level, the write data path interface is configured to stop transmitting the write data and the write address to the address conversion unit.

At block S3, a target address and the write data are transmitted by the address conversion unit to a plurality of storage control units, and a target storage control unit is determined.

In some embodiments, the address conversion unit is configured to cache the received write address and write data, convert the write address into the target address based on configuration information, and automatically skip a damaged storage control unit in a process of converting the write address.

The address conversion unit is configured to transmit the target address and the write data to the storage control unit. The hit storage control unit is the target storage control unit.

At block S4, a feedback signal of the target storage control unit is obtained by the address conversion unit, and the feedback signal is transmitted by the address conversion unit to the target controller.

In some embodiments, the target storage control unit is configured to cache, in response to receiving the target address and the write data, the target address and the write data, and transmit the feedback signal to the address conversion unit. The address conversion unit is configured to transmit the feedback signal to the target controller through the write data path interface.

At block S5, in response to the feedback signal being writable, a write signal is transmitted by the target controller to the target storage control unit, and in response to the write signal being received, the write data is stored by the target storage control unit.

In some embodiments, the target controller is configured to determine, based on the feedback signal, whether the target storage control unit is allowed to receive the write signal. When the target storage control unit is configured to be allowed to receive the write signal, the target controller is configured to determine the target storage control unit as the target storage control unit, and the target controller is configured to generate the write signal. The target controller is configured to transmit the write signal to the write data path interface. The write data path interface is configured to transmit the write signal to the target storage control unit through the address conversion unit. The target storage control unit is configured to store, in response to receiving the write signal, the write data based on the write address. When the target controller is configured to detect that the target storage control unit is not allowed to receive the write signal, the target controller is configured to continue to receive the feedback signal, and generate write signal until a state of the target storage control unit is determined to be writable.

In the embodiments of the present disclosure, through the channel selection unit, any number of controllers can be supported, and each controller can obtain control of the write data path. Therefore, the control of the write data path can be flexibly configured as desired or according to a predetermined parameter. Transmission of data between the write data path interface and the target controller is controlled through a data flow, which can reduce a symbol error rate and a packet loss rate, and improve reliability of a write operation. The address conversion unit can complete a conversion of the write address by itself based on configuration information of the control unit to produce a hit storage control unit. The hit storage control unit produced can determine a normally functioning storage control unit. Therefore, integrity of DAG data can be guaranteed while normal use of a proof-of-work operational chip can be ensured.

According to an exemplary embodiment of the present disclosure, the action of transmitting, by the address conversion unit, the target address and the write data to the plurality of storage control units, and determining, by the address conversion unit, the target storage control unit includes: converting, by the address conversion unit based on configuration information, the write address to obtain the target address; and transmitting, by the address conversion unit, the target address and the write data to the plurality of storage control units, and determining, by the address conversion unit, the target storage control unit.

In some embodiments, the write address is used as the target address when all the storage control units of the proof-of-work operational chip are valid. When one or more storage control units of the proof-of-work operational chip are damaged or invalid, the write address is converted to generate the target address. For example, the target address is determined by a data dynamic reconstruction method.

In an embodiment of the present disclosure, the conversion of the write address by the address conversion unit can filter out each damaged or invalid storage control unit, and ensure the normal use of the proof-of-work operational chip.

In an exemplary embodiment of the present disclosure, the action of transmitting, by the target controller in response to the feedback signal being writable, the write signal to the target storage control unit, and storing, by the target storage control unit in response to the write signal being received, the write data at block S5 includes actions at blocks S51 to S53.

At block S51, the feedback signal is detected by the target controller to determine whether the feedback signal is writable.

In some embodiments, when the feedback signal is a high-level signal, the feedback signal is writable; and when the feedback signal is a low-level signal, the feedback signal is unwritable.

At block S52, in response to determining that the feedback signal is writable, the target storage control unit is determined by the target controller.

In some embodiments, the target controller is configured to transmit, in response to receiving the high-level signal, the write signal to the write data path interface. The write signal is a high-level signal maintained for one clock cycle.

At block S53, the target storage control unit is controlled by the target controller to store the write data.

In this embodiment of the present disclosure, the target controller is configured to be synchronized with the clock signal, and determine whether the target storage control unit is in a writable state based on a level of the feedback signal, which ensures proper functioning of the target storage control unit and the integrity of the DAG data.

Figure 3:
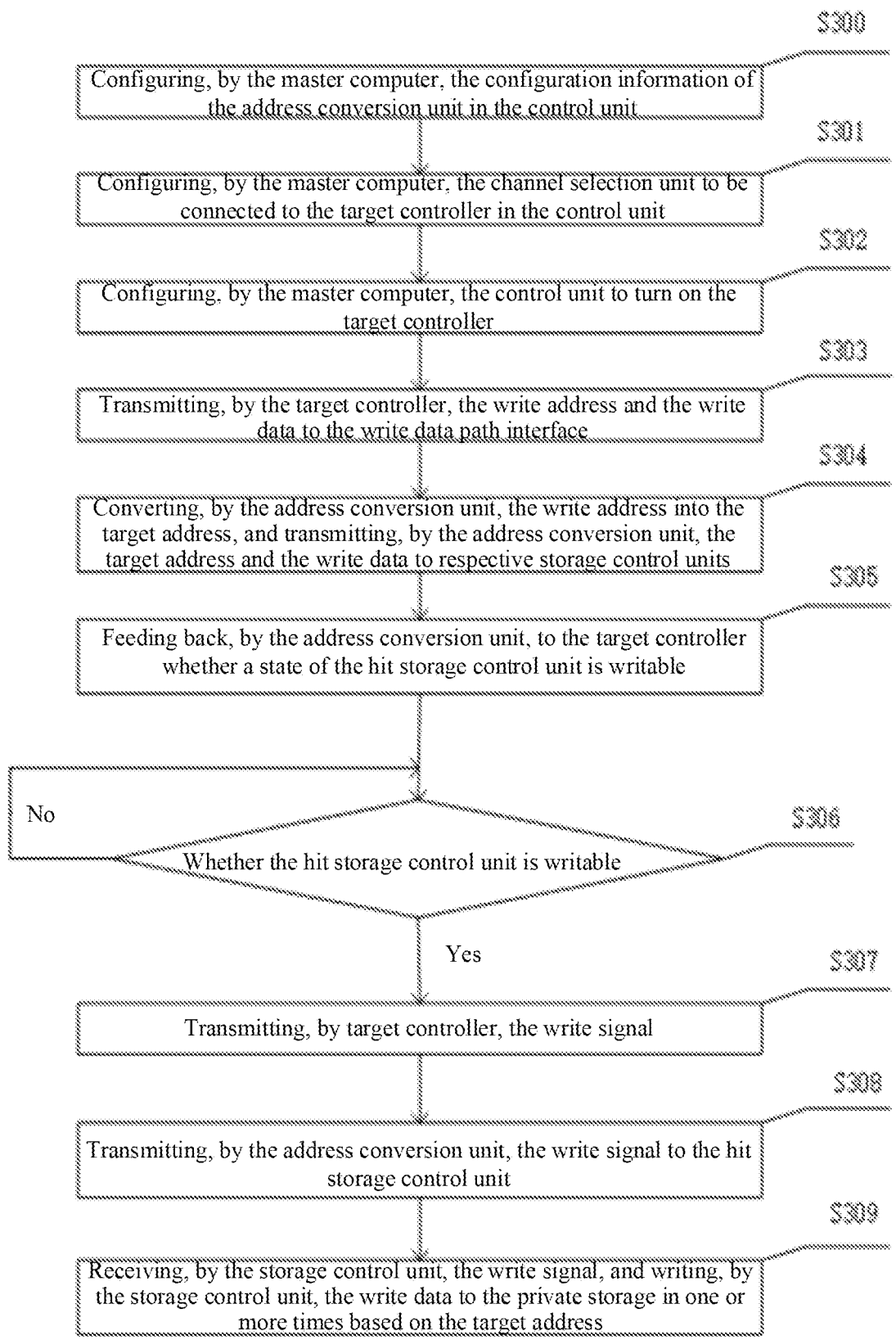
FIG. 3 is a flowchart illustrating a method for accessing a write data path of an on-chip storage control unit according to an embodiment of the present disclosure.

In some embodiments, as illustrated in FIG. 3, the above embodiments may be achieved by the following implementations.

At block S300, the master computer configures the configuration information of the address conversion unit in the control unit.

At block S301, the master computer configures the channel selection unit to be connected to the target controller in the control unit.

At block S302, the master computer configures the control unit to turn on the target controller.

At block S303, the target controller transmits the write address and the write data to the write data path interface.

At block S304, the address conversion unit converts the write address into the target address, and transmits the target address and the write data to respective storage control units.

At block S305, the address conversion unit feeds back to the target controller whether a state of the hit storage control unit is writable.

At block S306, whether the hit storage control unit is writable is determined. When the hit storage control unit is unwritable, feedback on whether the state of the hit storage control unit is writable continues being received.

At block S307, when the hit storage control unit is writable, the target controller transmits the write signal.

At block S308, the address conversion unit transmits the write signal to the hit storage control unit.

At block S309, the storage control unit receives the write signal, and writes the write data to the private storage in one or more times based on the target address.

According to an embodiment of the present disclosure, an apparatus for accessing a write data path of an on-chip storage control unit is provided. The apparatus includes a first transmitting module, a second transmitting module, a determining module, a feedback module, and a storage module.

The first transmitting module is configured to transmit, by a target controller, a write address and write data to a write data path interface. The second transmitting module is configured to transmit, by the write data path interface, the write address and the write data to an address conversion unit. The determining module is configured to transmit, by the address conversion unit, a target address and the write data to a plurality of storage control units, and determine, by the address conversion unit, a target storage control unit. The feedback module is configured to obtain, by the address conversion unit, a feedback signal of the target storage control unit, and transmit, by the address conversion unit, the feedback signal to the target controller. The storage module is configured to transmit, by the target controller in response to the feedback signal being writable, a write signal to the target storage control unit, and store, by the target storage control unit in response to the write signal being received, the write data.

In an exemplary implementation, the apparatus further includes, prior to the action of transmitting, by the target controller, the write address and the write data to the write data path interface: obtaining the target controller based on a selection of a channel selection unit on a plurality of controllers; and connecting the target controller to the write data path interface based on the channel selection unit.

In an exemplary implementation, the action of transmitting, by the address conversion unit, the target address and the write data to the plurality of storage control units, and determining, by the address conversion unit, the target storage control unit includes:

converting, by the address conversion unit based on configuration information, the write address to obtain the target address; and transmitting, by the address conversion unit, the target address and the write data to the plurality of storage control units, and determining, by the address conversion unit, the target storage control unit.

In an exemplary implementation, the action of obtaining, by the address conversion unit, the feedback signal of the target storage control unit, and transmitting, by the address conversion unit, the feedback signal to the target controller includes: transmitting, by the address conversion unit, the feedback signal to the target controller through the write data path interface.

In an exemplary implementation, the action of transmitting, by the target controller in response to the feedback signal being writable, the write signal to the target storage control unit, and storing, by the target storage control unit in response to the write signal being received, the write data includes: detecting, by the target controller, the feedback signal to determine whether the feedback signal is writable; determining, by the target controller in response to determining that the feedback signal is writable, the target storage control unit; and controlling, by the target controller, the target storage control unit to store the write data.

In an exemplary implementation, the action of controlling, by the target controller, the target storage control unit to store the write data includes: generating, by the target controller based on the target storage control unit, the write signal; transmitting, by the target controller, the write signal to the address conversion unit through the write data path interface; transmitting, by the address conversion unit, the write signal to the target storage control unit; and storing, by the target storage control unit based on the write signal and the target address, the write data.

In addition, other components and functions of the circuit according to the embodiments of the present disclosure are known to those skilled in the art. To reduce redundancy, details thereof will be omitted here.

It should be noted that, the logic and/or step described in other manners herein or shown in the flowchart, for example, a particular sequence table of executable instructions for realizing the logical function, may be specifically achieved in any computer-readable medium to be used by an instruction execution system, apparatus, or device (such as a system based on a computer, a system including a processor, or other systems capable of obtaining instructions from the instruction execution system, apparatus, or device and executing the instructions), or to be used in combination with the instruction execution system, apparatus, or device.

It should be understood that each part of the present disclosure may be realized by hardware, software, firmware, or a combination thereof. In the above embodiments, a plurality of steps or methods may be realized by software or firmware stored in the memory and executed by an appropriate instruction execution system. For example, when it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combinational logic gate circuit, a Programmable Gate Array (PGA), a Field Programmable Gate Array (FPGA), etc.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In the description of the present disclosure, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc., is based on the orientation or position relationship shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, such as two, three, etc., unless otherwise specifically defined.

In the present disclosure, unless otherwise clearly specified and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. For those of ordinary skill in the art, the specific meaning of the above-mentioned terms in the present disclosure can be understood according to specific circumstances.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

Although the embodiments of the present disclosure have been shown and described above, it can be understood that the above-mentioned embodiments are exemplary and should not be construed as limiting the present disclosure. Those of ordinary skill in the art can make changes, modifications, substitutions and modifications to the above-mentioned embodiments within the scope of the present disclosure.

What is claimed is:

1. A method for accessing a write data path of an on-chip storage control unit, the method comprising:
transmitting, by a target controller, a write address and write data to a write data path interface;

transmitting, by the write data path interface, the write address and the write data to an address conversion unit;

transmitting, by the address conversion unit, a target address and the write data to a plurality of storage control units, and determining, by the address conversion unit, a target storage control unit;

obtaining, by the address conversion unit, a feedback signal of the target storage control unit, and transmitting, by the address conversion unit, the feedback signal to the target controller; and transmitting, by the target controller in response to the feedback signal indicating that the target storage control unit is writable, a write signal to the target storage control unit, and storing, by the target storage control unit in response to the write signal being received, the write data.

2. The method according to claim 1, further comprising, prior to said transmitting, by the target controller, the write address and the write data to the write data path interface:

obtaining the target controller based on a selection of a channel selection unit on a plurality of controllers; and connecting the target controller to the write data path interface based on the channel selection unit.

3. The method according to claim 2, wherein said transmitting, by the address conversion unit, the target address and the write data to the plurality of storage control units, and determining, by the address conversion unit, the target storage control unit comprises:

converting, by the address conversion unit based on configuration information, the write address to obtain the target address; and transmitting, by the address conversion unit, the target address and the write data to the plurality of storage control units, and determining, by the address conversion unit, the target storage control unit.

4. The method according to claim 3, wherein said obtaining, by the address conversion unit, the feedback signal of the target storage control unit, and transmitting, by the address conversion unit, the feedback signal to the target controller comprises:

transmitting, by the address conversion unit, the feedback signal to the target controller through the write data path interface.

5. The method according to claim 3, wherein said transmitting, by the target controller in response to the feedback signal indicating that the target storage control unit is writable, the write signal to the target storage control unit, and storing, by the target storage control unit in response to the write signal being received, the write data comprises:

detecting, by the target controller, the feedback signal to determine whether the feedback signal indicates that the target storage control unit is writable;

determining, by the target controller in response to determining that the feedback signal indicates that the target storage control unit is writable, the target storage control unit; and controlling, by the target controller, the target storage control unit to store the write data.

6. The method according to claim 4, wherein said controlling, by the target controller, the target storage control unit to store the write data comprises:

generating, by the target controller based on the target storage control unit, the write signal;

transmitting, by the target controller, the write signal to the address conversion unit through the write data path interface;

transmitting, by the address conversion unit, the write signal to the target storage control unit; and storing, by the target storage control unit based on the write signal and the target address, the write data.

7. An apparatus for accessing a write data path of an on-chip storage unit, the apparatus comprising:

a first transmitting module configured to transmit, by a target controller, a write address and write data to a write data path interface;

a second transmitting module configured to transmit, by the write data path interface, the write address and the write data to an address conversion unit;

a determining module configured to transmit, by the address conversion unit, a target address and the write data to a plurality of storage control units, and determine, by the address conversion unit, a target storage control unit;

a feedback module configured to obtain, by the address conversion unit, a feedback signal of the target storage control unit, and transmit, by the address conversion unit, the feedback signal to the target controller; and a storage module configured to transmit, by the target controller in response to the feedback signal indicating that the target storage control unit is writable, a write signal to the target storage control unit, and store, by the target storage control unit in response to the write signal being received, the write data.

8. A circuit for accessing a write data path of an on-chip storage control unit, the circuit comprising:

a plurality of controllers configured to be screened to determine a target controller;

a write data path interface configured to receive a write address and write data transmitted by the target controller;

an address conversion unit configured to receive the write address and the write data that are transmitted by the write data path interface, and a target control storage unit; and a plurality of storage control units configured to receive a target address and the write data that are transmitted by the address conversion unit, and transmit a feedback signal to the target controller, wherein the target controller is configured to determine, from the plurality of storage control units based on the feedback signal, whether the target storage control unit is writable, and control the target storage control unit to store the write data in response to determining that the target storage control unit is writable.

9. The circuit according to claim 8, wherein the plurality of controllers is connected to a channel selection unit, the channel selection unit being configured to screen the plurality of controllers to determine the target controller.

10. The circuit according to claim 9, wherein the channel selection unit and the address conversion unit are connected to a control unit.

11. The circuit according to claim 10, wherein:

the address conversion unit is configured to convert, in response to the write address being received, the write address into the target address based on configuration information, and transmit the target address and the write data to the storage control unit; and the address conversion unit is configured to automatically skip a damaged storage control unit in a process of converting the write address.

* * * * *